US012722058B2

(12) United States Patent
Zhou

(10) Patent No.: US 12,722,058 B2
(45) Date of Patent: Sep. 1, 2026

(54) LIGHTWEIGHT HIGH-STRENGTH BAT AND PREPARATION METHOD THEREFOR

(71) Applicant: Tianchang Zhengmu Aluminum Technology Co., Ltd, Anhui (CN)

(72) Inventor: Liangzheng Zhou, Anhui (CN)

(73) Assignee: Tianchang Zhengmu Aluminum Technology Co., Ltd, Anhui (CN)

( * ) Notice: Subject to any disclaimer, the term of this patent is extended or adjusted under 35 U.S.C. 154(b) by 308 days.

(21) Appl. No.: 18/687,814

(22) PCT Filed: Sep. 21, 2022

(86) PCT No.: PCT/CN2022/120242
§ 371 (c)(1),
(2) Date: Feb. 29, 2024

(87) PCT Pub. No.: WO2023/226258
PCT Pub. Date: Nov. 30, 2023

(65) Prior Publication Data

US 2024/0382813 A1 Nov. 21, 2024

(30) Foreign Application Priority Data

May 24, 2022 (CN) ......................... 202210570033.4

(51) Int. Cl.
*A63B 59/54* (2015.01)
*A63B 102/18* (2015.01)
(Continued)

(52) U.S. Cl.
CPC ............ *A63B 59/54* (2015.10); *B29C 70/202* (2013.01); *B29C 70/205* (2013.01); *B29C 70/34* (2013.01);
(Continued)

(58) Field of Classification Search
CPC ................ A63B 59/54; A63B 2102/18; A63B 2209/023; A63B 59/50; B29C 70/202;
(Continued)

(56) References Cited

U.S. PATENT DOCUMENTS 3,972,528 A * 8/1976 McCracken ........... A63B 60/08 427/256

FOREIGN PATENT DOCUMENTS

CA 2306036 C * 10/2003 ............. A63B 59/51
CA 2866875 4/2015
(Continued)

OTHER PUBLICATIONS

"International Search Report (Form PCT/ISA/210) of PCT/CN2022/120242", mailed on Feb. 17, 2023, with English translation thereof, pp. 1-4.

(Continued)

*Primary Examiner* — Jeffrey D Carlson
(74) *Attorney, Agent, or Firm* — JCIPRNET

(57) ABSTRACT

Disclosed is a lightweight high-strength bat and a preparation method therefor, including a hollow fiber bat main body layer and a tough layer, where the epoxy structural adhesive film is prepared from the following raw materials in parts by weight: 45-65% of bisphenol A epoxy resin, 5-10% of p-aminophenol triglycidyl amine, 4-6% of dicyandiamide, 2-4% of an organic urea accelerator, 1-5% of a KH560 silane coupling agent, 5-10% of solid nitrile rubber, 7-15% of liquid carboxyl-terminated nitrile rubber, 7-15% of epoxidized polybutadiene liquid rubber, and 1-5% of 8-hydroxyquinoline. The high-strength fiber layer serves as a main body structure layer and is light, then the epoxy structural adhesive film is adopted to coat the main body layer of the fiber bat, an epoxy structural adhesive can permeate into the
(Continued)

fiber layer, a bonding force between the layers is enhanced, and the strength of the bat is further improved.

8 Claims, 3 Drawing Sheets

(51) Int. Cl.

| | |
|---|---|
| ***B29C 70/20*** | (2006.01) |
| ***B29C 70/34*** | (2006.01) |
| ***B29K 63/00*** | (2006.01) |
| ***B29K 105/08*** | (2006.01) |
| ***B29K 307/04*** | (2006.01) |
| ***B29K 309/08*** | (2006.01) |
| ***B29L 31/52*** | (2006.01) |

(52) U.S. Cl.

CPC ..... *A63B 2102/18* (2015.10); *A63B 2209/023* (2013.01); *B29K 2063/00* (2013.01); *B29K 2105/0881* (2013.01); *B29K 2307/04* (2013.01); *B29K 2309/08* (2013.01); *B29K 2995/0051* (2013.01); *B29L 2031/52* (2013.01)

(58) Field of Classification Search

CPC ..... B29C 70/205; B29C 70/34; B29C 70/342; B29C 70/345; B29K 2063/00; B29K 2105/0881; B29K 2307/04; B29K 2309/08; B29K 2995/0051; B29L 2031/52; B32B 1/00; B32B 5/02; B32B 27/12; B32B 27/32; B32B 27/38; B32B 2260/021; B32B 2262/101; B32B 2262/106; B32B 2307/558

See application file for complete search history.

(56) References Cited

FOREIGN PATENT DOCUMENTS

| | | |
|---|---|---|
| CN | 101254662 A * | 9/2008 |
| CN | 105080094 | 11/2015 |
| CN | 204840848 | 12/2015 |
| CN | 114931732 | 8/2022 |

OTHER PUBLICATIONS

"Written Opinion of the International Searching Authority (Form PCT/ISA/237) of PCT/CN2022/120242", mailed on Feb. 7, 2023, pp. 1-4.

* cited by examiner

LIGHTWEIGHT HIGH-STRENGTH BAT AND PREPARATION METHOD THEREFOR

CROSS-REFERENCE TO RELATED APPLICATION

This application is a 371 of international application of PCT application serial no. PCT/CN2022/120242, filed on Sep. 21, 2022, which claims the priority benefit of China application no. 202210570033.4 filed on May 24, 2022. The entirety of each of the above mentioned patent applications is hereby incorporated by reference herein and made a part of this specification.

TECHNICAL FIELD

The present disclosure relates to the technical field of bats, and particularly relates to a lightweight high-strength bat and a preparation method therefor.

DESCRIPTION OF RELATED ART

Baseball is one of ball sports, and also a competitive sport of batting with a metal rod during offense and defense confrontations. During the batting process, a player needs to swing his/her bat with all his/her strength to hit a ball, so the bat needs to be lightweight. However, existing lightweight bats have poor strength and toughness, and are prone to deformation and cracking during use, thus having a short service life.

SUMMARY

To solve the technical problems existing in the Background, the present disclosure provides a lightweight high-strength bat and a preparation method therefor.

The lightweight high-strength bat provided in the present disclosure includes a hollow fiber bat main body layer and a tough layer formed by coating a surface of the fiber bat main body layer with an epoxy structural adhesive film, where

- the fiber bat main body layer is formed by coating a bat core rod with fiber prepreg cloth and then removing the bat core rod; and
- the epoxy structural adhesive film is prepared from the following raw materials in parts by weight: 45-65% of bisphenol A epoxy resin, 5-10% of p-aminophenol triglycidyl amine, 4-6% of dicyandiamide, 2-4% of an organic urea accelerator, 1-5% of a KH560 silane coupling agent, 5-10% of solid nitrile rubber, 7-15% of liquid carboxyl-terminated nitrile rubber, 7-15% of epoxidized polybutadiene liquid rubber, and 1-5% of 8-hydroxyquinoline.

In this aspect, the organic urea accelerator is UR500, which is an accelerator for epoxy resin curing.

Preferably, between the fiber bat main body layer and the tough layer, a Biaxially Oriented Polypropylene (BOPP) layer and a fiber layer are further formed by sequentially coating the surface of the fiber bat main body layer with a BOPP isolation film and fiber prepreg cloth respectively.

Preferably, between the fiber bat main body layer and the tough layer, a first BOPP layer, a first fiber layer, a second BOPP layer and a second fiber layer are further formed by sequentially coating the surface of the fiber bat main body layer with the BOPP isolation film, the fiber prepreg cloth, the BOPP isolation film and the fiber prepreg cloth respectively.

Preferably, a thickness of the fiber bat main body layer is 3.0-4.2 mm, and a thickness of the tough layer is 0.26-0.30 mm.

Preferably, the thickness of the fiber bat main body layer is 1.8-2.0 mm, a thickness of the BOPP layer is 0.04-0.06 mm, a thickness of the fiber layer is 1.8-2.5 mm, and the thickness of the tough layer is 0.26-0.30 mm.

Preferably, the thickness of the fiber bat main body layer is 1.5-1.8 mm, a thickness of the first BOPP layer is 0.04-0.06 mm, a thickness of the first fiber layer is 1.5-1.8 mm, a thickness of the second BOPP layer is 0.04-0.06 mm, a thickness of the second fiber layer is 2.0-2.5 mm, and the thickness of the tough layer is 0.26-0.30 mm.

Preferably, the epoxy structural adhesive film is prepared by mixing and kneading various raw materials to obtain a sizing material and then performing hot pressing of the sizing material to form a film.

Preferably, the fiber prepreg cloth is made by attaching glass fiber and/or carbon fiber to a liquid sticky resin, arranging the fibers in parallel and evenly, and pasting the fibers under the action of the liquid sticky resin.

The present disclosure further provides a preparation method for the lightweight high-strength bat, including the following steps:

- S1, determining an outer diameter of the core rod used for winding yarn according to the outer diameter and thickness of the bat;
- S2, coating the core rod with the fiber prepreg cloth to obtain the fiber bat main body layer coated on the core rod;
- S3, coating the surface of the fiber bat main body layer with the epoxy structural adhesive film to form the tough layer, and taking out the core rod to obtain a preform;
- S4, inserting a long nylon bag into a cavity of the preform, sealing both ends of the nylon bag with air nozzles, pressurizing the nylon bag through the air nozzle at one end, then placing the preform in a forming mold, heating and pressurizing for molding and curing; and
- S5, taking out the preform, taking out the nylon bag to obtain a rough embryo of a bat, and cleaning to obtain a finished bat.

In the S3, according to actual needs, before coating the surface of the fiber bat main body layer with the epoxy structural adhesive film, the BOPP layer and the fiber layer are further formed by sequentially coating the surface the fiber bat main body layer with the BOPP isolation film and the fiber prepreg cloth respectively, then the fiber layer is coated with the epoxy structural adhesive film to form the tough layer, and the core rod is taken out to obtain the preform.

In the S3, according to actual needs, before coating the surface of the fiber bat main body layer with the epoxy structural adhesive film, the BOPP layer, the fiber layer, the BOPP layer and the fiber layer are further formed by sequentially coating the surface the fiber bat main body layer with the BOPP isolation film, the fiber prepreg cloth, the BOPP isolation film and the fiber prepreg cloth respectively, then the fiber layer is coated with the epoxy structural adhesive film to form the tough layer, and the core rod is taken out to obtain the preform.

Beneficial effects: the high-strength fiber layer of the present disclosure serves as a main body structure layer and is light, then the epoxy structural adhesive film is adopted to coat the main body layer of the fiber bat, epoxy structural adhesive can permeate into the fiber layer, a bonding force between the layers is enhanced, and the strength of the bat is further improved. The prepared bat is light, has good strength and toughness, and is not prone to deformation and cracking after long-term use.

In the epoxy structural adhesive film, the bisphenol A epoxy resin is used as a matrix resin, and the solid nitrile rubber, the liquid carboxyl-terminated nitrile rubber and the epoxidized polybutadiene liquid rubber are added for blending modification, where the solid nitrile rubber has good impact resistance, the liquid nitrile rubber is capable of enhancing the dissolution of the solid nitrile rubber in the epoxy resin, making it effectively and evenly distributed without phase separation, and avoiding the decline in toughening properties and cohesion caused by phase separation, and also has a toughening effect; in the cured adhesive film, the bisphenol A epoxy resin serves as a continuous phase, the liquid carboxyl-terminated nitrile rubber and the solid nitrile rubber are microprecipitated at the nanoscale, a "sea-island structure" is formed as a dispersed phase, and the periphery of the sea-island structure generates chemical bonds with the matrix resin of the continuous phase through carboxyl groups, so the two are integrated and are not separated really; and during the energy transfer process, under the action of an external force, the nitrile rubber of the sea-island structure absorbs energy through the dispersed phase and gets deformed, and when the external force is removed, the nitrile rubber of the sea-island structure restores its original shape, thereby eliminating internal stress, generating toughness and preventing internal cracking due to the stress. In addition, the epoxidized polybutadiene contains epoxy functional groups and is a high-toughness material that participates in the reaction of the matrix resin. After curing, an interpenetrating network structure is formed between the epoxidized polybutadiene and the matrix epoxy resin, which enhances the overall cohesion. The film rheology of the epoxy structural adhesive is low. When being cured, the prepreg is still a whole, but there still exists a certain fluidity due to the pressure. Before gelling, permeation between the carbon fiber prepreg cloth is achieved, objectively enhancing the bonding force between carbon fiber cloth layers. When a tubular carbon fiber product is damaged under pressure, carbon layers are disintegrated first, and then carbon fiber filaments are broken. The epoxy structural adhesive film is acting to enhance the bonding force between the layers, which is equivalent to seaming the carbon layers, and plays a role of enhancing the strength of tubular products.

In the present disclosure, according to actual needs, a BOPP layer and a fiber layer can be further coated on the fiber bat main body layer and the tough layer, where the BOPP layer plays the role of isolating and layering, which can reduce internal stress of the bat. The bat, under the action of an external force, due to reduction of the internal stress, it is more likely to get deformed and eliminate impact energy.

In the present disclosure, according to actual needs, the fiber bat main body layer and the tough layer can be further coated with a BOPP layer, a fiber layer, a BOPP layer and a fiber layer in sequence respectively. The two-layer BOPP layer isolation technology can be used to maximize the performance of the bat.

DESCRIPTION OF THE EMBODIMENTS

Figure 1:
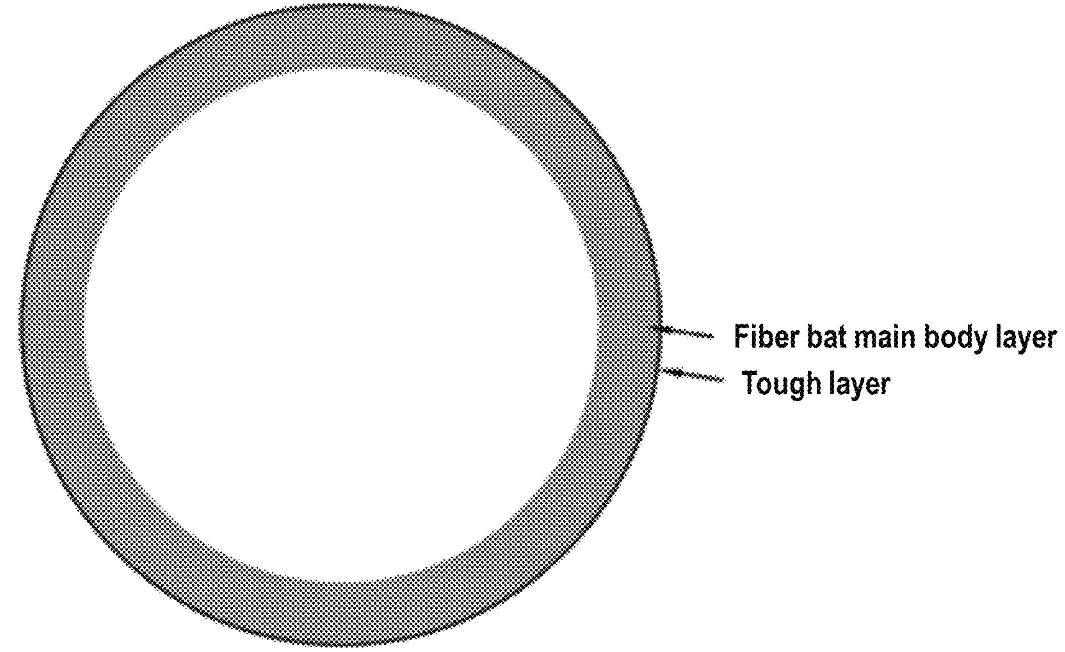
FIG. 1 is a schematic diagram of a cross section of a bat in Embodiment 1 of the present disclosure.
Figure 2:
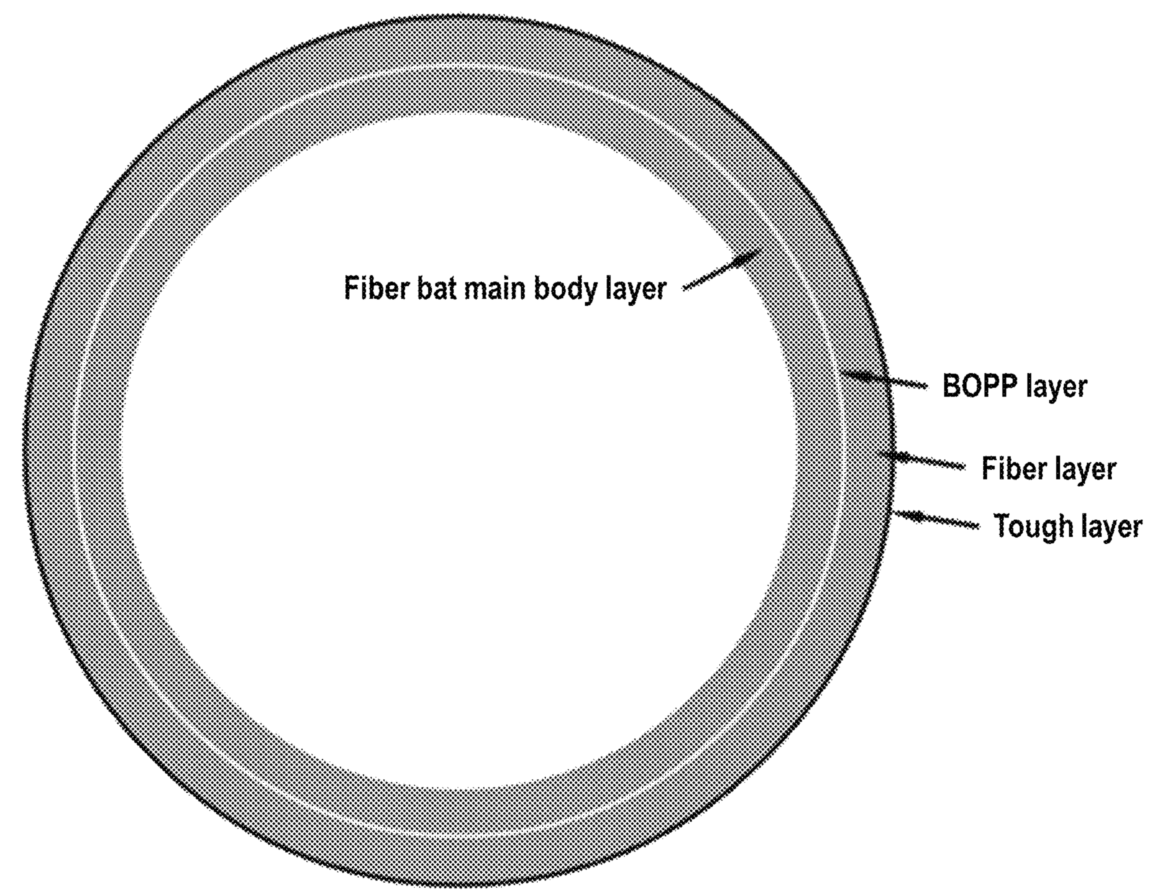
FIG. 2 is a schematic diagram of a cross section of a bat in Embodiment 2 of the present disclosure.
Figure 3:
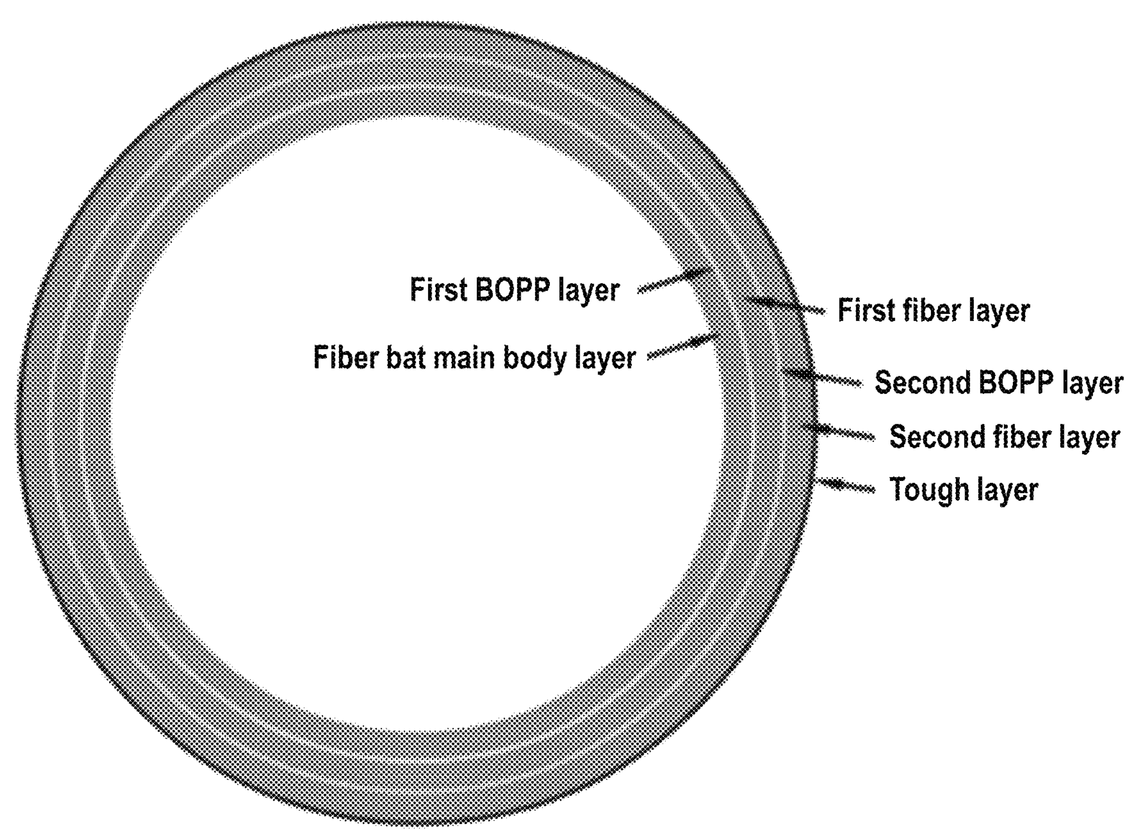
FIG. 3 is a schematic diagram of a cross section of a bat in Embodiment 3 of the present disclosure.

In the following embodiments, fiber prepreg cloth includes 175 #high-tenacity glass fiber prepreg cloth and 150 #high-strength carbon fiber prepreg cloth.

The technical solution of the present disclosure will be described in detail below through specific embodiments.

Embodiment 1

A lightweight high-strength bat provided in the present disclosure includes a hollow fiber bat main body layer and a tough layer formed by coating a surface of the fiber bat main body layer with an epoxy structural adhesive film, where thicknesses of the fiber bat main body layer and the tough layer are 3.6 mm and 0.28 mm respectively.

The epoxy structural adhesive film is prepared from the following raw materials in parts by weight: 55% of bisphenol A epoxy resin, 7% of p-aminophenol triglycidyl amine, 5% of dicyandiamide, 3% of an organic urea accelerator UR500, 2% of a KH560 silane coupling agent, 6% of solid nitrile rubber, 10% of liquid carboxyl-terminated nitrile rubber, 10% of epoxidized polybutadiene liquid rubber, and 2% of 8-hydroxyquinoline; and the epoxy structural adhesive film is prepared by mixing and kneading various raw materials to obtain a sizing material and then performing hot pressing of the sizing material to form a film.

A preparation method for the lightweight high-strength bat includes the following steps:

- S1, an outer diameter of the core rod used for winding yarn was determined according to the outer diameter and thickness of the bat:
- S2, the core rod was coated with the fiber prepreg cloth to obtain the fiber bat main body layer coated on the core rod;
- S3, the surface of the fiber bat main body layer was coated with the epoxy structural adhesive film to form the tough layer, and the core rod was taken out to obtain a preform;
- S4, a long nylon bag was inserted into a cavity of the preform, both ends of the nylon bag were sealed with air nozzles, the nylon bag was pressurized through the air nozzle at one end, then the preform was placed in a forming mold, and heating and pressurizing were performed for molding and curing; and
- S5, the preform was taken out, the nylon bag was taken out to obtain a rough embryo of a bat, and cleaning was performed to obtain a finished bat.

Embodiment 2

Compared with Embodiment 1, this embodiment is different only in that: 1. thicknesses of a fiber bat main body layer and a tough layer are 3.0 mm and 0.30 mm respectively: 2. contents of raw materials of an epoxy structural adhesive film are different; and specifically, the epoxy structural adhesive film is prepared from the following raw materials in parts by weight: 63% of bisphenol A epoxy resin, 6% of p-aminophenol triglycidyl amine, 6% of dicyandiamide, 3% of an organic urea accelerator UR500, 2% of a KH560 silane coupling agent, 5% of solid nitrile rubber, 7% of liquid carboxyl-terminated nitrile rubber, 7% of epoxidized polybutadiene liquid rubber, and 1% of 8-hydroxyquinoline.

Embodiment 3

Compared with Embodiment 1, this embodiment is different only in that: 1. thicknesses of a fiber bat main body layer and a tough layer are 4.2 mm and 0.26 mm respectively; 2. contents of raw materials of an epoxy structural adhesive film are different; and specifically, the epoxy structural adhesive film is prepared from the following raw materials in parts by weight: 45% of bisphenol A epoxy resin, 10% of p-aminophenol triglycidyl amine, 4% of dicyandiamide, 2% of an organic urea accelerator UR500, 2% of a KH560 silane coupling agent, 10% of solid nitrile rubber, 15% of liquid carboxyl-terminated nitrile rubber, 10% of epoxidized polybutadiene liquid rubber, and 2% of 8-hydroxyquinoline.

Embodiment 4

A lightweight high-strength bat provided in the present disclosure includes a hollow fiber bat main body layer, a Biaxially Oriented Polypropylene (BOPP) layer and a fiber layer further formed by sequentially coating a surface of the fiber bat main body layer with a BOPP isolation film and fiber prepreg cloth respectively, as well as a tough layer formed by coating the surface of the fiber layer with an epoxy structural adhesive film, where thicknesses of the fiber bat main body layer, the BOPP layer, the fiber layer and the tough layer are 2.0 mm, 0.05 mm, 2.3 mm and 0.28 respectively.

The composition and preparation of the epoxy structural adhesive film are the same as those in Embodiment 1.

A preparation method for the lightweight high-strength bat includes the following steps:

S1, an outer diameter of the core rod used for winding yarn was determined according to the outer diameter and thickness of the bat;

S2, the core rod was coated with the fiber prepreg cloth to obtain the fiber bat main body layer coated on the core rod;

S3, the BOPP layer and the fiber layer were further formed by sequentially coating the surface the fiber bat main body layer with the BOPP isolation film and the fiber prepreg cloth respectively, then the fiber layer was coated with the epoxy structural adhesive film to form the tough layer, and the core rod was taken out to obtain the preform;

S4, a long nylon bag was inserted into a cavity of the preform, both ends of the nylon bag were sealed with air nozzles, the nylon bag was pressurized through the air nozzle at one end, then the preform was placed in a forming mold, and heating and pressurizing were performed for molding and curing; and S5, the preform was taken out, the nylon bag was taken out to obtain a rough embryo of a bat, and cleaning was performed to obtain a finished bat.

Embodiment 5

A lightweight high-strength bat provided in the present disclosure includes a hollow fiber bat main body layer, a Biaxially Oriented Polypropylene (BOPP) layer, a first BOPP layer, a first fiber layer, a second BOPP layer and a second fiber layer further formed by sequentially coating a surface of the fiber bat main body layer with a BOPP isolation film, fiber prepreg cloth, the BOPP isolation film and the fiber prepreg cloth respectively, as well as a tough layer formed by coating the surface of the fiber layer with an epoxy structural adhesive film, where thicknesses of the fiber bat main body layer, the first BOPP layer, the first fiber layer, the second BOPP layer, the second fiber layer and the tough layer are 1.6 mm, 0.05 mm, 1.6 mm, 0.05 mm, 2.4 mm and 0.28 mm respectively.

The composition and preparation of the epoxy structural adhesive film are the same as those in Embodiment 1.

The present disclosure further provides a preparation method for the lightweight high-strength bat, including the following steps:

S1, an outer diameter of the core rod used for winding yarn was determined according to the outer diameter and thickness of the bat;

S2, the core rod was coated with the fiber prepreg cloth to obtain the fiber bat main body layer coated on the core rod;

S3, the first BOPP layer, the first fiber layer, the second BOPP layer and the second fiber layer were formed by sequentially coating the surface of the fiber bat main body layer with the BOPP isolation film, the fiber prepreg cloth, the BOPP isolation film and the fiber prepreg cloth respectively, then the fiber layer was coated with the epoxy structural adhesive film to form the tough layer, and the core rod was taken out to obtain a preform:

S4, a long nylon bag was inserted into a cavity of the preform, both ends of the nylon bag were sealed with air nozzles, the nylon bag was pressurized through the air nozzle at one end, then the preform was placed in a forming mold, and heating and pressurizing were performed for molding and curing; and S5, the preform was taken out, the nylon bag was taken out to obtain a rough embryo of a bat, and cleaning was performed to obtain a finished bat.

The performance of the lightweight high-strength bat prepared in embodiments 1-5 of the present disclosure was tested, and the test results were shown in Table 1.

Test items are as follows:

1. ASA certification: refers to the fastpich or slowpitch bat certification standard. A test method is to rotate a pressure gauge clockwise until the pressure reading reaches 500 psi and apply a preload. This ensures good contact between a device and the bat. A cam lever is pulled to press a barrel upward/horizontally until reaching a lever locking position, and in this case, a value displayed on the pressure gauge is the ASA certified value.
2. ASTM test: test steps include putting a bat into a fixture, pressing downward by 5 LBF with a compressor and then resetting to zero, and continuing to press downward by 0.07 inch through the compressor. A force value of testing is an ASTM measured value.
3. Flatwise compression test of destruction: test steps include cutting a bat into 50 mm test sections, and pressing downward through a compressor until the test sections are completely broken, to stop the test. A maximum value of pressure that the test sections can withstand is a flatwise compression value.
4. Bombardment rebound coefficient test: a softball is launched by a ball machine to hit a bat, and the bat bounces out the ball after being hit by the ball. A flying speed of the test ball is a rebound value.
5. Weight test: a finished weight of a finished product of a bat is tested.

TABLE 1

Data on the performance of lightweight high-strength bats prepared in embodiments 1-5.

| | Embodiment 1 | Embodiment 2 | Embodiment 3 | Embodiment 4 | Embodiment 5 |
|---|---|---|---|---|---|
| ASA certification (PSI) | 1850 | 1825 | 1820 | 1500 | 1250 |
| ASTM test (LBF) | 330 | 315 | 312 | 280 | 250 |
| Flatwise compression test of destruction (N) | 3500 | 3250 | 3345 | 3450 | 3350 |
| Bombardment rebound coefficient (MPH) | 94 | 94 | 95 | 98 | 101 |
| Weight (OZ) | 20 | 21 | 20.5 | 26 | 28 |

The foregoing descriptions are merely preferred specific implementations of the present disclosure, and are not intended to limit the protection scope of the present disclosure. Any equivalent replacements or changes made by a person skilled in the art according to the technical solution of the present disclosure and the inventive concepts thereof within the technical scope disclosed in the present disclosure shall fall within the protection scope of the present disclosure.

What is claimed is:

1. A lightweight high-strength bat, comprising a hollow fiber bat main body layer and a tough layer located on a surface of the fiber bat main body layer, wherein the tough layer comprises an epoxy structural adhesive film, wherein the fiber bat main body layer comprises fiber prepreg cloth; and the epoxy structural adhesive film comprises the following raw materials in parts by weight: 45-65% of bisphenol A epoxy resin, 5-10% of p-aminophenol triglycidyl amine, 4-6% of dicyandiamide, 2-4% of an organic urea accelerator, 1-5% of a KH560 silane coupling agent, 5-10% of solid nitrile rubber, 7-15% of liquid carboxyl-terminated nitrile rubber, 7-15% of epoxidized polybutadiene liquid rubber, and 1-5% of 8-hydroxyquinoline.

2. The lightweight high-strength bat according to claim 1, further comprising a Biaxially Oriented Polypropylene layer and a fiber layer located between the fiber bat main body layer and the tough layer.

3. The lightweight high-strength bat according to claim 1, further comprising a first Biaxially Oriented Polypropylene layer, a first fiber layer, a second Biaxially Oriented Polypropylene layer and a second fiber layer located between the fiber bat main body layer and the tough layer.

4. The lightweight high-strength bat according to claim 1, wherein a thickness of the fiber bat main body layer is 3.0-4.2 mm, and a thickness of the tough layer is 0.26-0.30 mm.

5. The lightweight high-strength bat according to claim 2, wherein a thickness of the fiber bat main body layer is 1.8-2.0 mm, a thickness of the Biaxially Oriented Polypropylene layer is 0.04-0.06 mm, a thickness of the fiber layer is 1.8-2.5 mm, and a thickness of the tough layer is 0.26-0.30 mm.

6. The lightweight high-strength bat according to claim 3, wherein a thickness of the fiber bat main body layer is 1.5-1.8 mm, a thickness of the first Biaxially Oriented Polypropylene layer is 0.04-0.06 mm, a thickness of the first fiber layer is 1.5-1.8 mm, a thickness of the second Biaxially Oriented Polypropylene layer is 0.04-0.06 mm, a thickness of the second fiber layer is 2.0-2.5 mm, and a thickness of the tough layer is 0.26-0.30 mm.

7. The lightweight high-strength bat according to claim 1, wherein the fiber prepreg cloth comprises a liquid sticky resin, glass fiber and/or carbon fiber.

8. A preparation method for a lightweight high-strength bat, comprising the following steps:

S1, an outer diameter of a bat core rod used for winding yarn was determined according to an outer diameter and a thickness of the lightweight high-strength bat;

S2, the bat core rod was coated with a fiber prepreg cloth to obtain a fiber bat main body layer coated on the bat core rod;

S3, a surface of the fiber bat main body layer was coated with an epoxy structural adhesive film to form a tough layer, and the bat core rod was taken out to obtain a preform;

S4, inserting a long nylon bag into a cavity of the preform, sealing both ends of the nylon bag with air nozzles, pressurizing the nylon bag through the air nozzle at one end, then placing the preform in a forming mold, heating and pressurizing for molding and curing; and S5, the preform was taken out, the nylon bag was taken out to obtain a rough embryo of the lightweight high-strength bat, and cleaning was performed to obtain the lightweight high-strength bat, wherein the epoxy structural adhesive film is prepared from the following raw materials in parts by weight: 45-65% of bisphenol A epoxy resin, 5-10% of p-aminophenol triglycidyl amine, 4-6% of dicyandiamide, 2-4% of an organic urea accelerator, 1-5% of a KH560 silane coupling agent, 5-10% of solid nitrile rubber, 7-15% of liquid carboxyl-terminated nitrile rubber, 7-15% of epoxidized polybutadiene liquid rubber, and 1-5% of 8-hydroxyquinoline.

* * * * *